(12) United States Patent
Li et al.

(10) Patent No.: US 11,614,526 B1
(45) Date of Patent: Mar. 28, 2023

(54) VIRTUAL WINDOWS FOR LIDAR SAFETY SYSTEMS AND METHODS

(71) Applicant: INNOVUSION IRELAND LIMITED, Los Altos, CA (US)

(72) Inventors: Yimin Li, Cupertino, CA (US); Rui Zhang, Palo Alto, CA (US); Junwei Bao, Los Altos, CA (US)

(73) Assignee: Innovusion, Inc., Sunnyvale, CA (US)

( * ) Notice: Subject to any disclaimer, the term of this patent is extended or adjusted under 35 U.S.C. 154(b) by 758 days.

(21) Appl. No.: 16/546,702

(22) Filed: Aug. 21, 2019

Related U.S. Application Data

(60) Provisional application No. 62/722,480, filed on Aug. 24, 2018.

(51) Int. Cl.
*G01S 7/497* (2006.01)
*G01S 7/484* (2006.01)
*G01S 17/10* (2020.01)

(52) U.S. Cl.
CPC .............. *G01S 7/497* (2013.01); *G01S 7/484* (2013.01); *G01S 17/10* (2013.01)

(58) Field of Classification Search
CPC ........ G01S 7/497; G01S 7/484; G01S 7/4865; G01S 7/487; G01S 7/4818; G01S 17/10; G01S 17/931; G01S 17/87; G01S 17/42; G01S 17/26
See application file for complete search history.

(56) References Cited

U.S. PATENT DOCUMENTS

| | | | |
|---|---|---|---|
| 3,897,150 A | 7/1975 | Bridges et al. |
| 4,464,048 A | 8/1984 | Farlow |
| 4,923,263 A | 5/1990 | Johnson |
| 5,006,711 A | 4/1991 | Cameron et al. |
| 5,006,721 A | 4/1991 | Cameron et al. |
| 5,157,451 A | 10/1992 | Taboada et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | DeAngelis et al. |
| 5,793,491 A | 8/1998 | Wangler et al. |
| 5,838,239 A | 11/1998 | Stern et al. |

(Continued)

FOREIGN PATENT DOCUMENTS

| | | |
|---|---|---|
| CN | 204758260 U | 11/2015 |
| CN | 204885804 U | 12/2015 |

(Continued)

OTHER PUBLICATIONS

"Mirrors", Physics LibreTexts, https://physlibretexts.org/Bookshelves/Optics/Supplemental_Modules_(Components)/Mirrors, (2021), 2 pages.

(Continued)

*Primary Examiner* — Sang H Nguyen
(74) *Attorney, Agent, or Firm* — Mauriel Kapouytian Woods LLP; Liang Huang

(57) ABSTRACT

Embodiments discussed herein refer to LiDAR systems and methods that use a virtual window to monitor for potentially unsafe operation of a laser. If an object is detected within the virtual window, the LiDAR system can be instructed to deactivate laser transmission.

20 Claims, 5 Drawing Sheets

(56) References Cited

U.S. PATENT DOCUMENTS

| | | |
|---|---|---|
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di |
| 7,489,865 B2 | 2/2009 | Varshneya et al. |
| 7,502,395 B2 | 3/2009 | Cheng et al. |
| 7,508,496 B2 | 3/2009 | Mettenleiter et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Be et al. |
| 9,086,273 B1 | 7/2015 | Gruver et al. |
| 9,121,703 B1 * | 9/2015 | Droz ................ G01S 17/04 |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,884,585 B1 * | 2/2018 | Lubbers ............ B60W 30/09 |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,185,027 B2 | 1/2019 | O'Keeffe |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,422,865 B2 | 9/2019 | Irish et al. |
| 10,429,425 B2 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,732,281 B2 | 8/2020 | LaChapelle |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,016,192 B2 | 5/2021 | Pacala et al. |
| 11,022,689 B2 | 6/2021 | Villeneuve et al. |
| 11,035,935 B2 | 6/2021 | Hinderling |
| 11,194,048 B1 | 12/2021 | Burbank et al. |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0109536 A1 * | 5/2006 | Mettenleiter ........ G01C 15/002 |
| | | 356/4.01 |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu et al. |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2014/0375752 A1 * | 12/2014 | Shoemake ............ H04N 7/14 |
| | | 348/14.07 |
| 2015/0078123 A1 | 3/2015 | Batcheller et al. |
| 2015/0084805 A1 | 3/2015 | Dawber |

(56) References Cited

U.S. PATENT DOCUMENTS

| | | |
|---|---|---|
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0033644 A1* | 2/2016 | Moore ............... G01S 7/4813 356/5.01 |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik et al. |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0061219 A1* | 3/2017 | Shin ....................... G06V 20/58 |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0088214 A1* | 3/2018 | O'Keeffe ............... G01S 7/4815 |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwolfer et al. |
| 2018/0231653 A1* | 8/2018 | Pradeep ............... G06V 40/23 |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 20100096931 A | 9/2010 |
| KR | 10-2012-0013515 A | 2/2012 |
| KR | 10-2013-0068224 A | 6/2013 |
| KR | 10-2018-0107673 A | 10/2018 |
| WO | 2002101408 A1 | 12/2002 |
| WO | 2017/110417 A1 | 6/2017 |
| WO | 2018/125725 A1 | 7/2018 |
| WO | 2018/126248 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |

(56) References Cited

FOREIGN PATENT DOCUMENTS

| WO | 2019165294 | 8/2019 |
|----|------------|--------|
| WO | 2020013890 A2 | 1/2020 |

OTHER PUBLICATIONS

"Why Wavelengths Matter in Fiber Optics", FirstLight, https://www.firstlight.net/why-wavelengths-matter-in-fiber-optics/, (2021), 5 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for international Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for international Application No. PCT/US2018/056577, 15 pages.
International Search Report and Written Opinion, dated Mar. 23, 2018, for international Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for international Application No. PCT/US2018/012705, 12 pages.
International Search Report and Written Opinion, dated Mar. 20, 2018, for international Application No. PCT/US2018/012703, 13 pages.

* cited by examiner

VIRTUAL WINDOWS FOR LIDAR SAFETY SYSTEMS AND METHODS

CROSS-REFERENCE TO A RELATED APPLICATION

This application claims the benefit of U.S. Provisional Application No. 62/722,480, filed Aug. 24, 2018, the disclosure of which is incorporated herein in its entirety.

FIELD OF THE INVENTION

The present disclosure relates to light detection and ranging (LiDAR), and in particular to LIDAR systems and methods that use virtual windows to enhance safety.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. LiDAR systems, for example, can provide the sensory input required by a semi-autonomous or fully autonomous vehicle. LiDAR systems can use a laser that projects beams of light. As LiDAR system become more ubiquitous, safe operation of the laser is desired.

BRIEF SUMMARY

Embodiments discussed herein refer to LiDAR systems and methods that use a virtual window to monitor for potentially unsafe operation of a laser.

In one embodiment, a system for use in a vehicle is provided that can include a LiDAR system operative to direct light pulses originating from a light source to specific locations within a field of view, proximity detection system operative to detect presence of an object within a fixed distance of the LiDAR system, and control system operative to instruct the LiDAR system to deactivate the light source in response to detection of the object within the fixed distance.

In another embodiment, a method for selectively disabling a LiDAR system is provided. This method can include monitoring a virtual window with a proximity detection system, wherein the virtual window extends a fixed distance beyond a periphery of the LiDAR system, detecting, via the proximity detection system, presence of an object within the virtual window, and deactivating a portion of the LiDAR system in response to detecting the object within the virtual window, wherein the portion prevents emission of light pulses from the LiDAR system.

In another embodiment, a method for enforcing safe operation of a LiDAR system is provided by transmitting light pulses from the LiDAR system, detecting whether a person is located within a virtual window zone of the LiDAR system, and deactivating the LiDAR system when the person is detected to be within the virtual window zone.

A further understanding of the nature and advantages of the embodiments discussed herein may be realized by reference to the remaining portions of the specification and the drawings.

DETAILED DESCRIPTION

Figure 1:
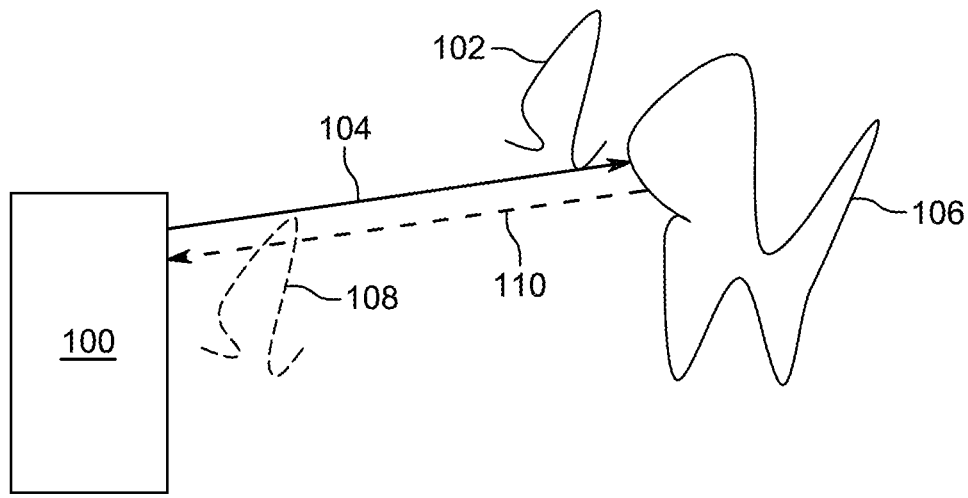
FIGS. 1-3 illustrate an exemplary LiDAR system using pulse signals to measure distances to points in the outside environment.

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Some light detection and ranging (LiDAR) systems use a single light source to produce one or more light signals of a single wavelength that scan the surrounding environment. The signals are scanned using steering systems that direct the pulses in one or two dimensions to cover an area of the surrounding environment (the scan area). When these systems use mechanical means to direct the pulses, the system complexity increases because more moving parts are required. Additionally, only a single signal can be emitted at any one time because two or more identical signals would introduce ambiguity in returned signals. In some embodiments of the present technology, these disadvantages and/or others are overcome.

For example, some embodiments of the present technology use one or more light sources that produce light of different wavelengths and/or along different optical paths. These light sources send light to a steering system at different angles so that the scan areas for the light signals are different (e.g., if two light sources are used to create two light signals, the scan area associated with each light source is different). This allows for tuning the signals to appropriate transmit powers and the possibility of having overlapping scan areas that cover scans of different distances. Longer ranges can be scanned with signals having higher power and/or slower repetition rate (e.g., when using pulsed light signals). Shorter ranges can be scanned with signals having lower power and/or high repetition rate (e.g., when using pulse light signals) to increase point density.

As another example, some embodiments of the present technology use signal steering systems with one or more dispersion elements (e.g., gratings, optical combs, prisms, etc.) to direct pulse signals based on the wavelength of the pulse. A dispersion element can make fine adjustments to a pulse's optical path, which may be difficult or impossible with mechanical systems. Additionally, using one or more dispersion elements allows the signal steering system to use few mechanical components to achieve the desired scanning capabilities. This results in a simpler, more efficient (e.g., lower power) design that is potentially more reliable (due to few moving components).

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed can be used to derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
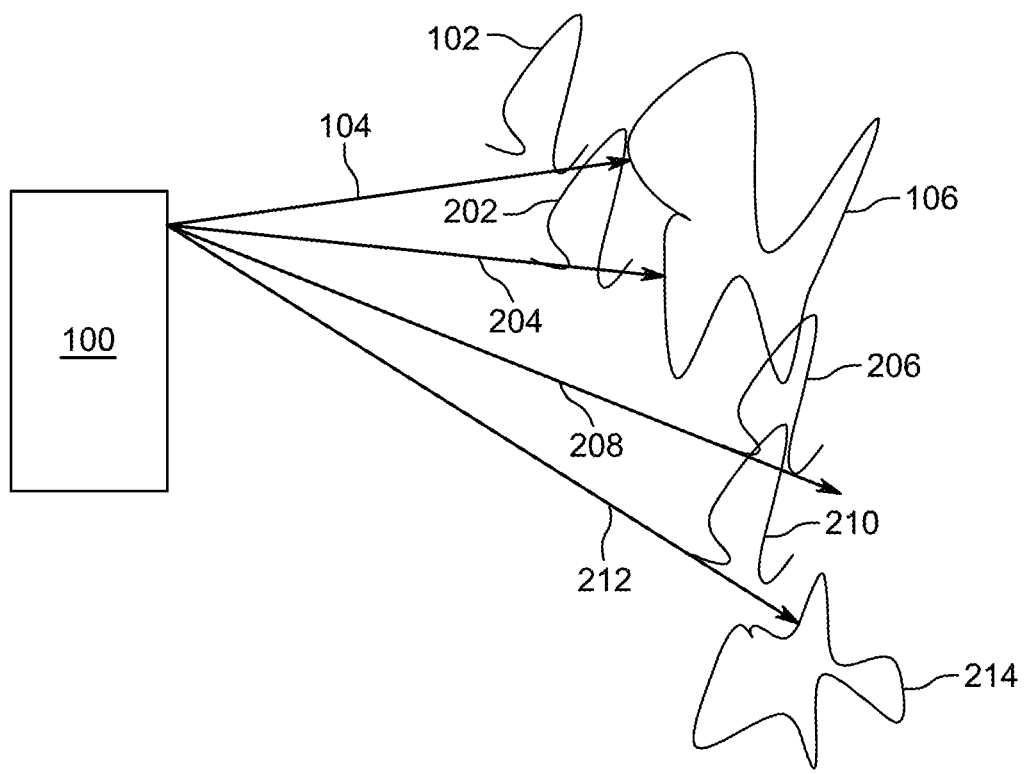
Figure 3:
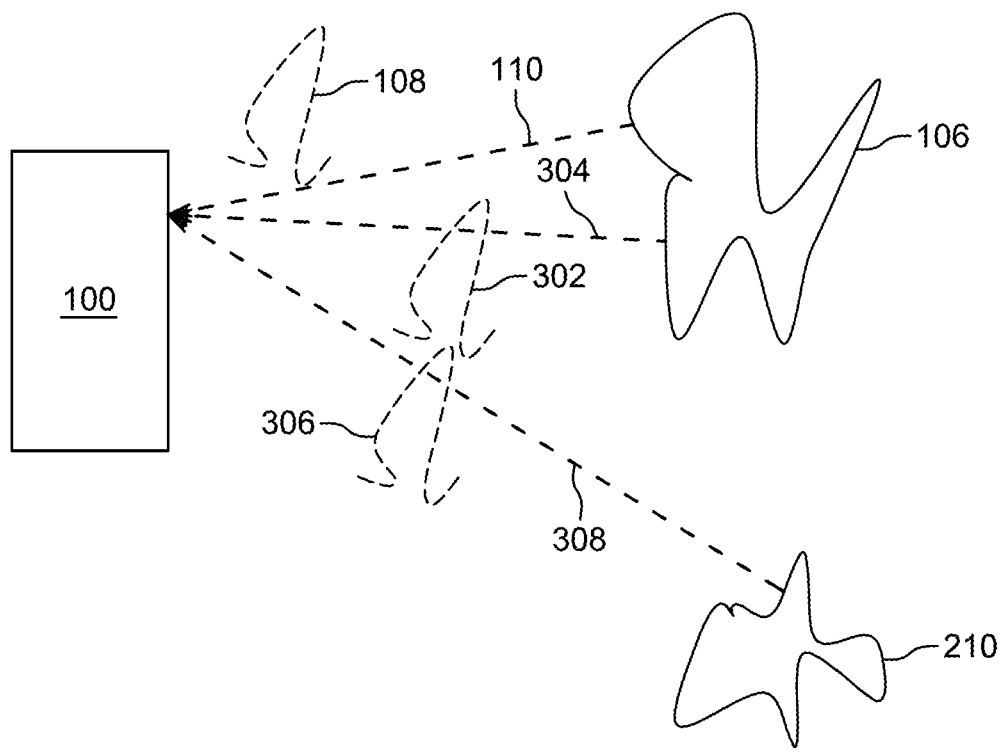

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects that can scatter sufficient amount of signal for the LiDAR light pulse within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses within a frame divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited by speed of light. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 MHz (and thus improving the density of points of the system) would significantly reduce the detection range of the system.

Figure 4:
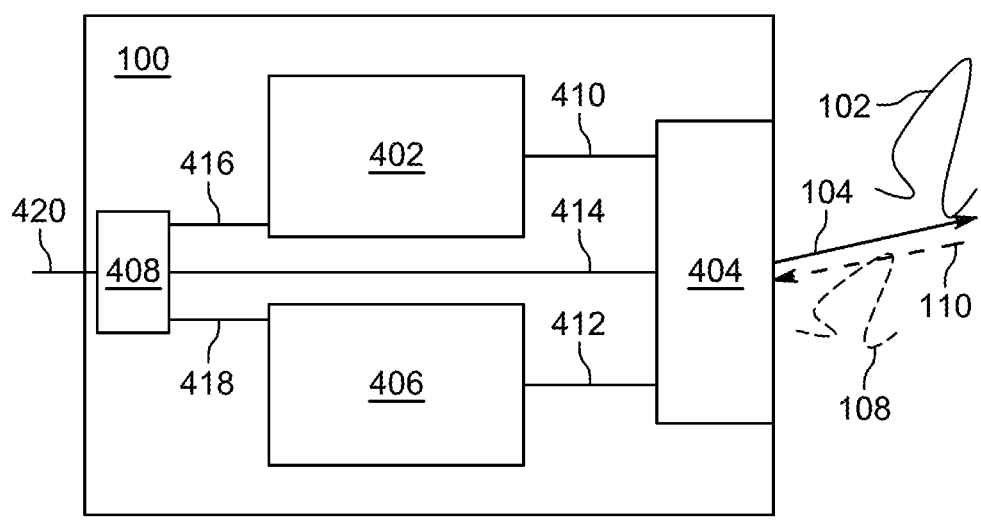
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse. Light source 402 may use diode lasers or fiber lasers to generate light pulses.

Signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). An example signal steering system is described in U.S. Patent Application Publication No. 2018/0188355, entitled "2D Scanning High Precision LiDAR Using Combination of Rotating Concave Mirror and Beam Steering Devices," the content of which is incorporated by reference in its entirety herein for all purposes. In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 5:
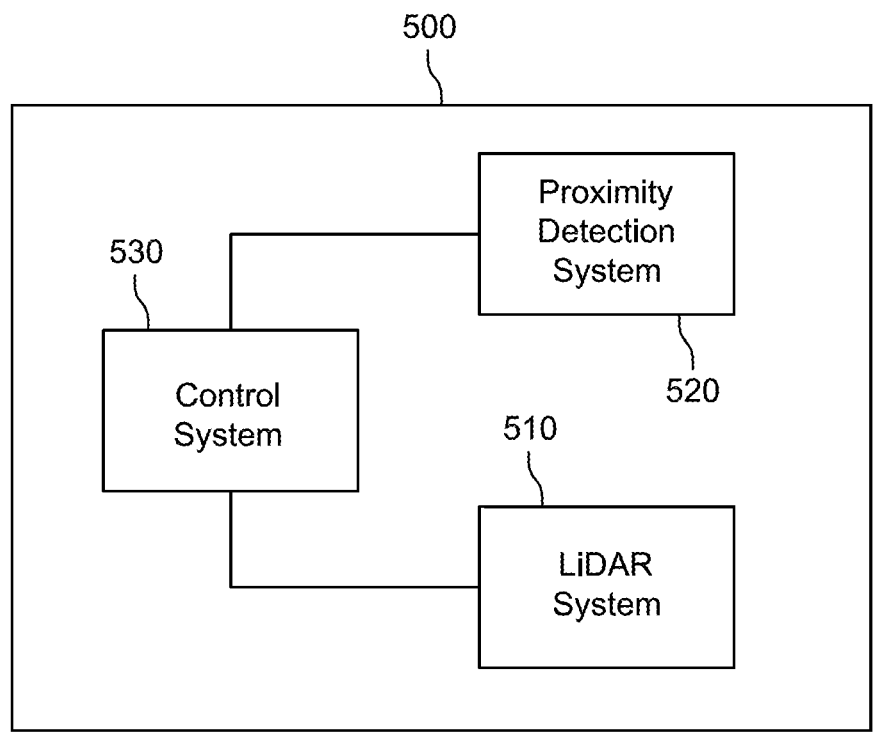
FIG. 5 shows an illustrative vehicle according to an embodiment.

FIG. 5 shows an illustrative vehicle 500 according to an embodiment. Vehicle 500 can include LiDAR system 510, proximity detection system 520, and control system 530. LiDAR system 510 and proximity detection system 520 can be mounted internally within vehicle 500, externally to vehicle 500, or mounted both internally within and externally to vehicle 500. LiDAR system 500 may perform the tasks discussed above in connection with FIGS. 1-4. Proximity detection system 520 is operative to perform short range detection of objects within a fixed distance of vehicle 500 or LiDAR system 510. In accordance with embodiments discussed herein, when an object is detected within the fixed distance, a laser being emitted by LiDAR system 510 can be turned OFF. This way, if it is desirable to run the laser power at levels that exceed laser safety rules or regulations, proximity detection system 520 can ensure that the laser is turned OFF in response to detection of objects within the fixed distance. Control system 530 may communicate with LiDAR system 510 and proximity detection system 520. For example, control system 530 may be able to instruct LiDAR system 510 to turn ON or OFF based on signals received from proximity detection system 520. In some embodiments, control system 530 may be included as part of LiDAR system 510.

Proximity detection system 520 may use any suitable detection sensor or detection means to determine whether an object is located within a fixed distance of LiDAR system 510. For example, proximity detection system 520 may use one or more infrared sensors, ultrasonic sensors, cameras, proximity sensors, facial recognition systems, thermal sensors, radar, LiDAR, or any combination thereof. In some embodiments, proximity detection system 520 may be specifically configured for detection of human beings. For example, detection system 520 may be able to apply analytics to data to distinguish between persons and non-persons. Proximity detection system 520 may be able to project a virtual window beyond a periphery of LiDAR system 510. The virtual window may define a zone that is monitored for the presence of an object. If an object is detected within the virtual window zone, detection system 520 may communicate a signal indicating detection of the object to control system 530, which may instruct LiDAR system 510 to deactivate, or least deactivate a light source responsible for transmitting light pulses. In another embodiment, a shutter or other light blocking mechanism may be used to prevent transmission of the light pulses in response to detection of the object within the virtual window zone.

Figure 6:
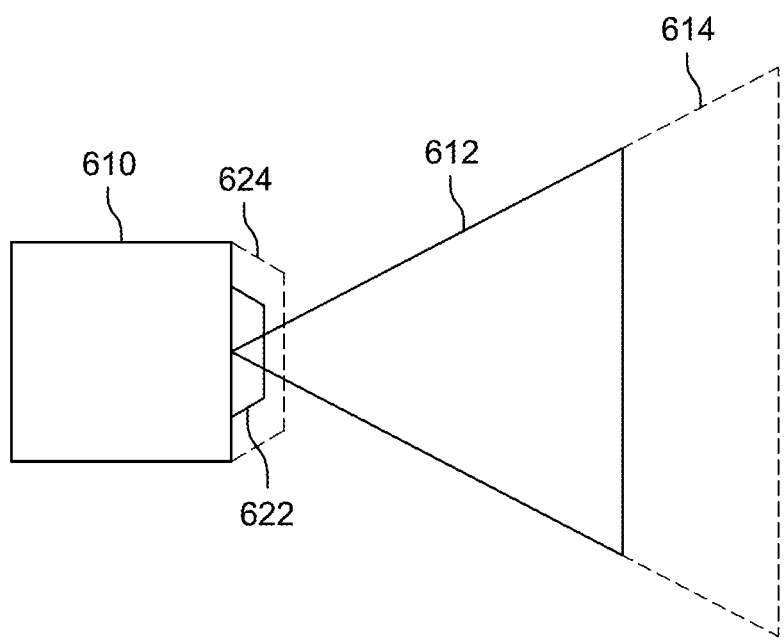
FIG. 6 shows an illustrative virtual window zone according to an embodiment.

FIG. 6 shows an illustrative virtual window zone according to an embodiment. In particular, FIG. 6 shows LiDAR system 610 that can project light pulses according to field of view (FOV) 612 or FOV 614. FOV 612 has less range than FOV 614. As such, an energy density or laser power may be greater with FOV 614 than it is with FOV 612. Energy density may be based on a combination of laser power, angular resolution and distance to the sensor. Denser angular resolution can result in greater energy density. Energy density will decrease as the distance increases. Also shown in FIG. 6 are illustrative virtual windows 612 and 614. Virtual windows 612 and 614 may define a virtual window zone that is monitored for presence of an object (e.g., human being). Two different virtual windows are shown to illustrate that different sized virtual window zones may be paired with different FOVs. In particular, the size of the virtual window zone may be proportional to the laser power or the energy density. In some embodiments, it only needs to cover near distance below a certain limit. As shown, virtual window 612 may be used when LiDAR 610 is operating with FOV 612, and virtual window 614 may be used when LiDAR 610 is operating with FOV 614. When an object is detected within virtual windows 612 or 614, LiDAR 610 is instructed to cease transmitting light pulses, for example, to comply with laser safety rules and regulations.

Figure 7A:
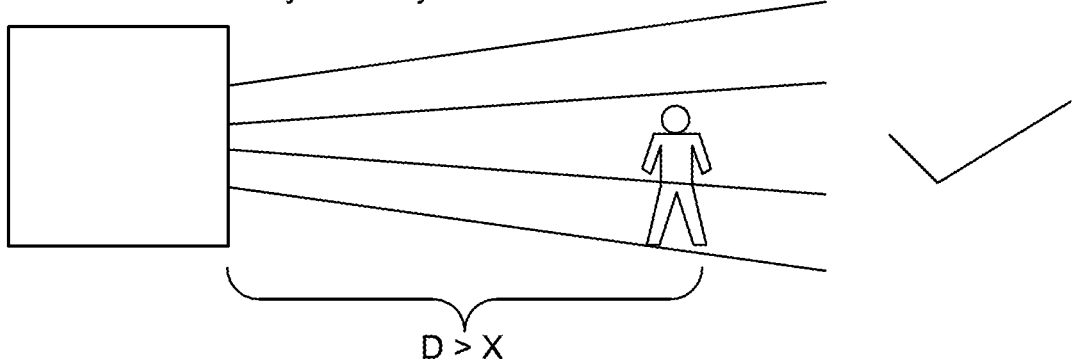
FIGS. 7A-7C show different illustrative scenarios of when a LiDAR system is deactivated in response to a detected object, according to various embodiments.
Figure 7B:
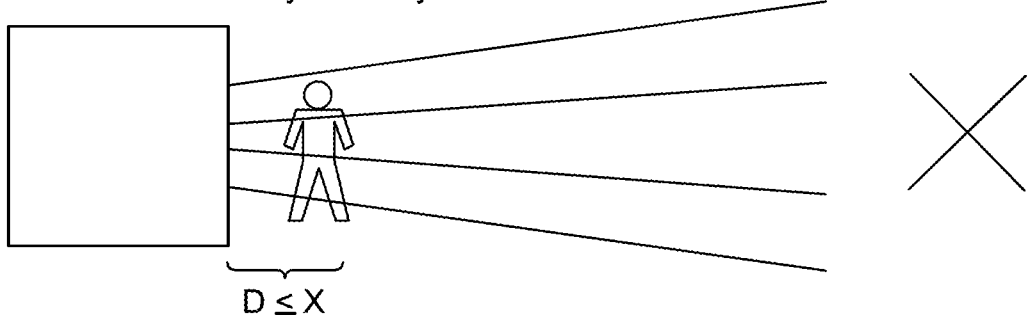
Figure 7C:
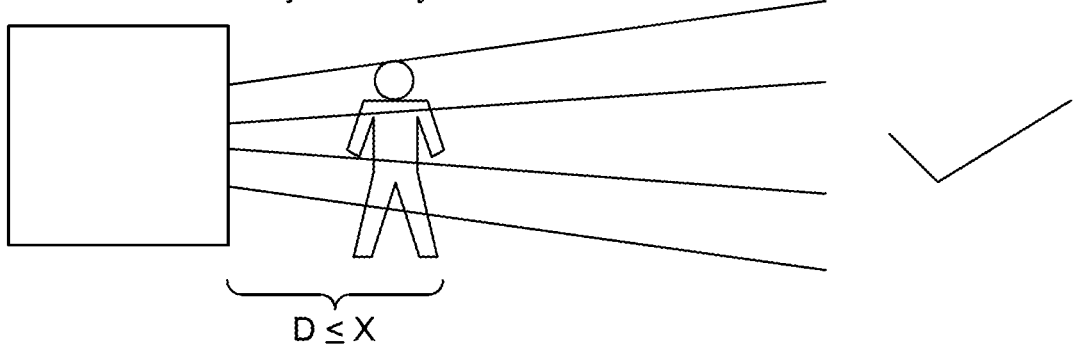

FIGS. 7A-7C show different illustrative scenarios of when a LiDAR system is deactivated in response to a detected object, according to various embodiments. Each of FIGS. 7A-7C shows a LiDAR system (as shown by the generic box, a person, a distance the person is from the LiDAR, and an indication of whether the laser density being emitted by the LiDAR is less than or more than a safety level. The safety level may be based on laser safety rules and regulations that may be issued by various governments, government organizations or agencies, treaties, standards bodies, or the like. For example, one laser safety rules require that a 1550 nm laser energy density be 10 mW or less within a 3.5 mm aperture at a distance of 100 mm. As another example, LiDAR systems may be required to operate within exposure limits specified, for Class 1 lasers as defined in the IEC 60825.1-2007 protocol. FIG. 7A shows a scenario in which the person is at a distance greater than X, where X may be defined by a virtual window (not shown) and laser density is greater than a safety level. In this scenario, the LiDAR system need not be deactivated because the person is not within the virtual window. In contrast, FIG. 7B shows a scenario in which the person is within the virtual window (as indicated by the distance, D, being less than or equal to X) and the laser density is greater than the safety level. In this scenario, the LiDAR system is deactivated because the person is within the virtual window. FIG. 7C shows a scenario where the person is within the virtual window, but the energy density is less than the safety level. Thus, even though the person is within the virtual window, the laser density is sufficiently low enough to not merit deactivation of the LiDAR system.

Figure 8:
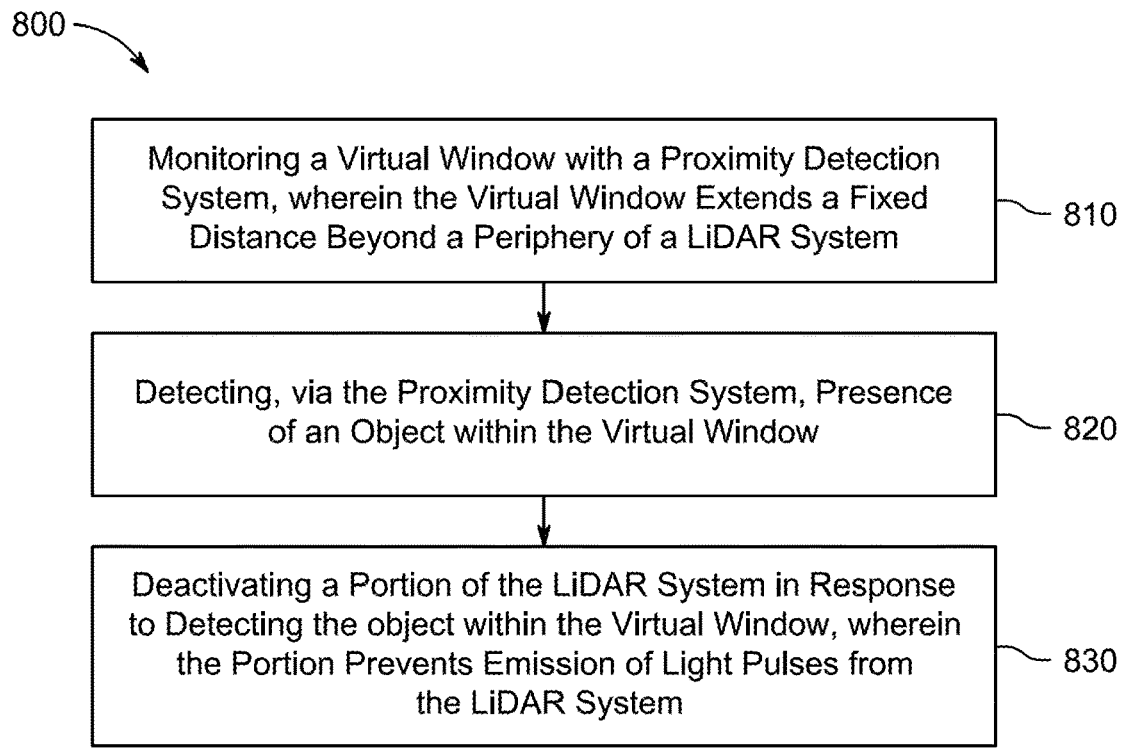
FIG. 8 shows illustrative process for selectively disabling a LiDAR system, according to an embodiment.

FIG. 8 shows illustrative process 800 for selectively disabling a LiDAR system. Starting at step 810, a virtual window is monitored with a proximity detection system, wherein the virtual window extends a fixed distance beyond a periphery of the LiDAR system. At step 820, presence of an object is detected, via the proximity detection system, within the virtual window. At step 830, a portion of the LiDAR system can be deactivated in response to detecting the object within the virtual window, wherein the portion prevents emission of light pulses from the LiDAR system.

It should be understood that the steps in FIG. 8 are merely illustrative and that additional steps may be added and the order to the steps may be rearranged.

Figure 9:
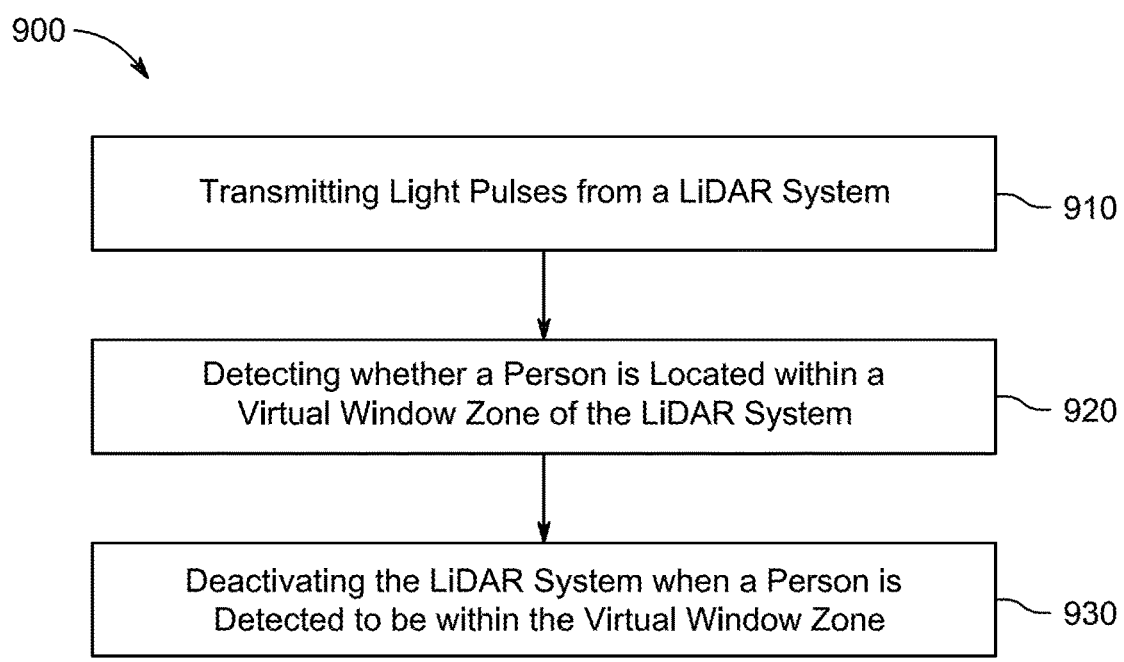
FIG. 9 shows illustrative process for enforcing safe operation of a LiDAR system, according to an embodiment.

FIG. 9 shows illustrative process 900 for enforcing safe operation of a LiDAR system, according to an embodiment. Starting at step 910, light pulses can be transmitted from the LiDAR system. At step 920, a determination is made as to whether a person is located within a virtual window zone of the LiDAR system. At step 930, the LiDAR system can be deactivated when the person is detected to be within the virtual window zone.

It should be understood that the steps in FIG. 9 are merely illustrative and that additional steps may be added and the order to the steps may be rearranged.

The embodiments discussed herein provide the necessary monitoring capabilities and laser shutdown mechanism to prevent unsafe laser exposure. It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-9, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A system for use in a vehicle, comprising:
  a light detection and ranging (LiDAR) system operative to direct light pulses originating from a light source to one or more locations within a field of view;
  a proximity detection system operative to detect presence of an object within a fixed distance of the LiDAR system; and
  a control system operative to instruct the LiDAR system to:
    determine whether an object is detected within the fixed distance and whether an energy density of the light pulses is greater than a safety level;
    deactivate the light source in response to a detection that an object is within the fixed distance and that the energy density of the light pulses is greater than the safety level; and
    continue to direct light pulses to the field of view in response to:
      a detection that the object is located greater than the fixed distance and the energy density of the light pulses is greater than the safety level, or
      a detection that the object is located within the fixed distance and the energy density of the light pulses is less than the safety level.

2. The system of claim 1, wherein the energy density of the light pulses within the field of view exceeds 10 milli-Watts within a 3.5 mm aperture at a distance of 100 mm external to the LiDAR system.

3. The system of claim 1, wherein the fixed distance is proportional to the energy density of the light pulses within the field of view.

4. The system of claim 1, wherein the fixed distance ranges between 0.1 meters and 1 meter.

5. The system of claim 1, wherein the object is a human being.

6. The system of claim 1, wherein the proximity detection system comprises an infrared sensor.

7. The system of claim 1, wherein the proximity detection system comprises at least one of an infrared sensor, an ultrasonic sensor, a camera, a proximity sensor, a facial recognition system, a thermal sensor, a radar, a LiDAR, or any combination thereof.

8. A method for selectively disabling a light detection and ranging (LiDAR) system, comprising:
  monitoring a virtual window with a proximity detection system, wherein the virtual window extends a fixed distance beyond a periphery of the LiDAR system;
  detecting, via the proximity detection system, presence of an object within the virtual window;
  determining whether an object is detected within the virtual window and whether an energy density of light pulses is greater than a safety level;
  deactivating a portion of the LiDAR system in response to a detection that an object is within the virtual window and that the energy density of the light pulses is greater than the safety level, wherein the portion prevents emission of the light pulses from the LiDAR system; and
  continuing to direct light pulses to the virtual window in response to:
    a detection that the object is not within the virtual window and the energy density of the light pulses is greater than the safety level, or
    a detection that the object is located within the virtual window and the energy density of the light pulses is less than the safety level.

9. The method of claim 8, further comprising:
  projecting the light pulses from a light source to one or more locations within a field of view.

10. The method of claim 9, wherein the energy density of the light pulses within the field of view exceeds 10 milli-Watts within 3.5 mm aperture at a distance of 100 mm external to the LiDAR system.

11. The method of claim 9, wherein the fixed distance is proportional to the energy density of the light pulses within the field of view.

12. The method of claim 8, wherein the portion of the LiDAR system comprises a light source.

13. The method of claim 8, wherein the fixed distance ranges between 0.1 meters and 1 meter.

14. The method of claim 8, further comprising:
  discriminating whether the object is a human being; and
  rejecting objects determined not to be a human being.

15. A method for enforcing safe operation of a light detection and ranging (LiDAR) system, comprising:
  transmitting light pulses from the LiDAR system;
  detecting whether a person is located within a virtual window zone of the LiDAR system;
  determining whether an energy density of light pulses is greater than a safety level;
  deactivating the LiDAR system when the person is detected to be within the virtual window zone and that the energy density of the light pulses is greater than the safety level; and
  continuing to transmit light pulses to the virtual window zone in response to:
    a detection that the person is not within the virtual window zone and the energy density of the light pulses is greater than the safety level, or
    a detection that the person is located within the virtual window zone and the energy density of the light pulses is less than the safety level.

16. The method of claim 15, wherein the virtual window zone extends beyond a periphery of the LiDAR system.

17. The method of claim 16, wherein the virtual window zone extends beyond the periphery of the LiDAR system by a fixed distance.

18. The method of claim 17, wherein the fixed distance is less than 1 meter.

19. The method of claim 15, wherein the transmitted light pulses are emitted at a power level that exceeds a laser safety standard.

20. The method of claim 15, wherein the transmitted light pulses are emitted such that an energy density exceeds a laser safety standard.

* * * * *